SAMMY F. CAROLLO
INVENTOR

BY *H.C. Baldwin*
ATTORNEY

United States Patent Office 3,538,403
Patented Nov. 3, 1970

3,538,403
PARTICLE-SENSING MATRIX
Sammy F. Carollo, Irving, Tex., assignor to Ling-Temco-Vought, Inc., Dallas, Tex., a corporation of Delaware
Filed Apr. 21, 1969, Ser. No. 818,039
Int. Cl. H01g 7/00
U.S. Cl. 317—246                                      4 Claims

ABSTRACT OF THE DISCLOSURE

A matrix of thin-film sensors for the detection of hypervelocity particles which penetrate the matrix has two sets of capacitive strips disposed parallel to each other but with the strips of each set aligned perpendicularly to the strips of the other set such that a grid of sensors is formed.

---

This invention relates to particle sensors and, more particularly, to the detection and analysis of hypervelocity particles.

The determination of the effects of micrometeoroids upon objects in an environment beyond the earth's atmosphere has become increasingly important in space technology. Of particular concern is the measurement of the velocities and incident angles of micrometeoroid particles impinging on vehicles in outer space. One technique developed for measuring the velocities of micrometeoroids which uses a capacitor-discharge type of sensor is disclosed in co-pending patent application Ser. No. 613,853. The means disclosed therein indicates the impingement of a hypervelocity particle by producing a pulse in the voltage across a parallel-plate capacitor upon penetration by the particle. Particles striking a thin-film capacitor at hypervelocities pass through the capacitor and partially ionize the capacitor material to form a plasma path which shorts and allows discharge of the capacitor. The discharge pulse is amplified and recorded by suitable circuitry. Through the use of two such sensors spaced a known distance apart, the velocity of the particle relative to the sensors is estimated by comparing the distance between the sensors with the time lapse between voltage pulses produced by a particle passing through both sensors. This technique does not, however, take into account the angle of incidence of the particle, but merely assumes perpendicular flight.

By the use of two matrix sensor elements spaced a known distance apart, it has been sought to determine not only velocity but also the angle of incidence of the impinging particle, whereby the true distance traversed by the particle between sensors may be calculated. Knowing the true distance traveled can be of great importance in accurately determining the velocity of a hypervelocity particle. For example, if two sensors twelve inches square are located three inches apart, a particle impinging on the extreme diagonal would actually travel about sixteen inches rather than three, and an estimate of its velocity based on a distance of three inches would be too small by a factor of more than five.

In a typical matrix sensor, rather than having two continuous, thin layers of conductive material separated by a third layer of dielectric material, each layer of conductive material is divided into a plurality of parallel conductive strips which are electrically insulated from each other, and the strips of the one layer are arranged perpendicularly to the strips of the other so as to form a grid of capacitor segments each defined by the superimposition of one of the strips upon another. Hence, if $n$ is the number of conducting strips in each layer, there are $n^2$ distinguishable detection segments. By providing two such matrices spaced a known distance apart, it is possible to compute the velocity and angle of incidence of a particle which penetrates both the two matrices. The disadvantage to such a three-layer matrix sensor is the electrical coupling or interference which develops between each capacitor segment and every other capacitor segment in the matrix. This coupling degrades the signal from the capacitor segment actually penetrated by a hypervelocity particle and makes it very difficult to determine the location of the discharged capacitor.

Accordingly, a major object of the invention is to eliminate electrical coupling between capacitors in a matrix sensor.

Other objects and advantages will be apparent from the specification and claims and from the accompanying drawing illustrative of the invention wherein:

In accordance with the present invention, there is provided a multilayered, capacitive matrix system coupled to suitable electrical circuitry for use in the detection and analysis of hypervelocity particles such as meteoroids and wherein electrical coupling or interference between capacitors within the matrix is avoided. The matrix comprises three thin conductive layers (comprising first, third, and fifth layers of the matrix) alternatively separated by two thin dielectric layers (comprising second and fourth layers, as will be described). The conductive material of the first and fifth layers is divided into a plurality of parallel strips with the strips in the first layer being disposed at right angles to the strips in the fifth layer. Suitable circuitry couples between the first and third layers and between the third and fifth layers convey capacitive discharge pulse signals which result from a conductive plasma path created by a particle penetrating all of the layers, the signals providing data which may be interpreted to give $x$ and $y$ coordinates of the point at which the particle penetrated the matrix.

By using the matrix with a second, similar matrix, disposed in register therewith and spaced a known distance therefrom, the successive penetration, by a particle, of both matrices creates successive electrical discharges, each occurring at the moment of penetration of a respective one of the matrices; these discharges are, in turn, sensed and recorded by a suitable electronic circuitry. The approximately or "uncorrected" velocity of the particle is computed from the time interval between the two pulses and the spacing between the matrices. By the use of two matrices, each comprising an array of capacitive sensor elements, the particular section of each matrix through which the particle passes is determined, and the angle of incidence of the particle with respect to the matrices is determined. The angle of incidence is then used to correct thet computed velocity by giving the actual distance traveled by the particle between the two matrices.

Figure 1:
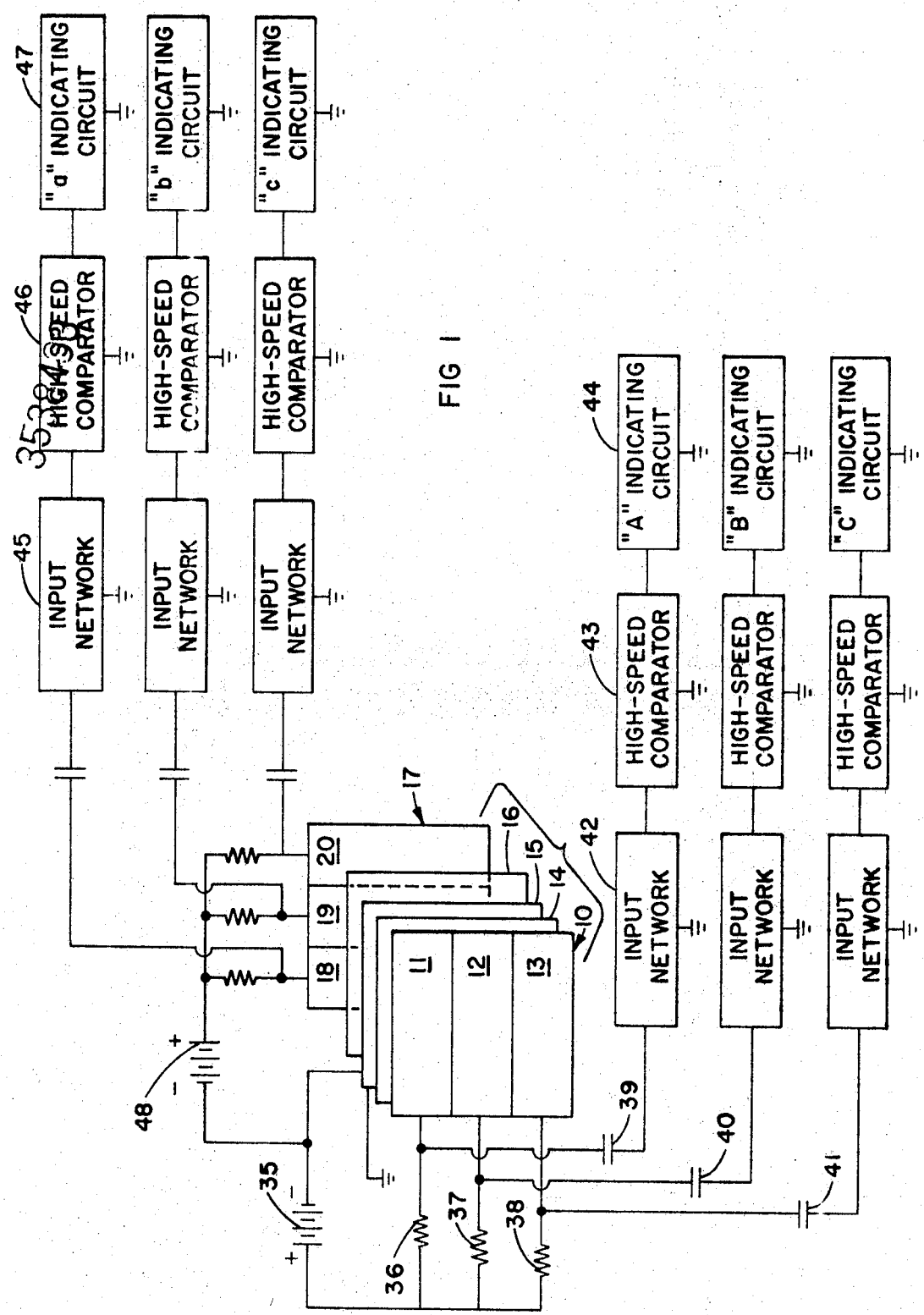
FIG. 1 is an exploded view of the sensor matrix of the invention with its components separated for clarity and with a schematic and block diagram of the associated circuitry in which it is used.

Referring now to FIG. 1, the matrix comprises a first layer 10, comprising a thin layer of conductive material divided into a first plurality of $n$ parallel strips 11, 12, 13, the strips being electrically isolated from each other, as will be described in more detail below. In the preferred embodiment, the first layer 10 is preferably of a square configuration and has vertical and horizontal axis, the strips 11, 12, 13 being aligned parallel to one of the axes; the first-layer parallel strips 11, 12, 13 thus are rectangular in shape and aligned horizontally as viewed in the drawing. The first layer 10 is formed of a very thin layer of a conductive material such as gold or aluminum; the thickness of each of the layers of the matrix is less than 25,000 angstroms and, typically, each layer is of the order of a few hundred angstroms in thickness. A second layer 14 is formed adjacent the first layer 10, the second layer comprising a thin layer of dielectric material in register with, and contacting the first layer 10. The second layer 14 is preferably of a polymeric material such as a copolymer of vinyl chloride and vinyl acetate, polycarbonate, or polysulfone. A third layer 15 comprises a thin layer of conductive material such as gold or aluminum. The third layer 15 is formed in register with and contacting the second layer 14 and is electrically insulated, by the second layer, from the first layer 10. A fourth layer 16, comprising a thin layer of dielectric material such as a copolymer of vinyl chloride and vinyl acetate, polycarbonate, or polysulfone is formed in register with and contacting the third layer 15, the third layer 15 being disposed between the second and the fourth layers 14, 16. A fifth layer 17 is formed in register with and contacting the fourth layer 16, the fourth layer providing electrical insulation between the third and fifth layers 15, 17. The fifth layer 17 comprises a second plurality of n parallel strips 18, 19, 20 similar to the strips 11, 12, 13 of the first layer 10 but aligned perpendicularly to the strips of the first layer. The strips 18, 19, 20 are thus vertically disposed as viewed in FIG. 1.

Figure 2:
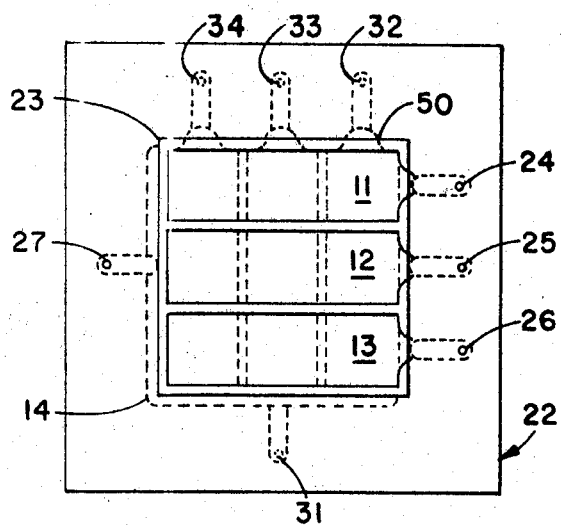
FIGS. 2, 3 and 4 are front, side, and rear views, respectively, of the matrix, FIG. 3 being taken on line III—III of FIG. 4.
Figure 3:
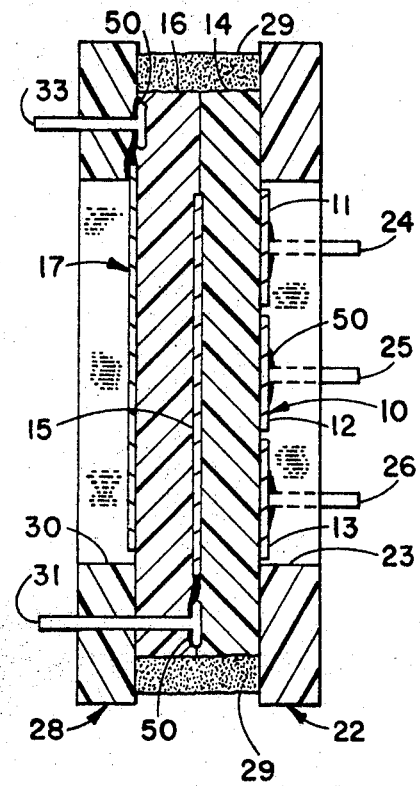
Figure 5:
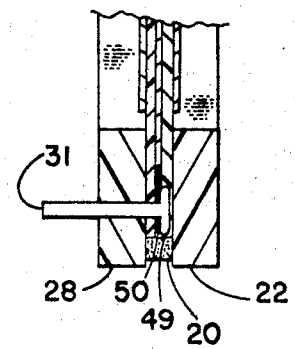
FIG. 5 is a fragmentary view of a portion of the invention as shown in FIG. 3.

Referring now to FIG. 3, a first non-conductive frame 22 supports the matrix (comprising layers 10, 14, 15, 16, 17). An opening 23 is formed through the first frame 22 and is of a configuration similar to the matrix, the matrix layers being disposed substantially in register with the frame opening 23. Suitable methods for making thin films comprising a capacitor of the type shown herein are described in the aforementioned patent application Ser. No. 613,853. The discussion therein is deemed sufficient to enable one of ordinary skill in the art to make the matrix of the present invention when it is added that the strips 11, 12, 13 of the first layer 10 and strips 18, 19, 20 of the fifth layer 17 are formed by appropriately masking the dielectric layer and vapor depositing the metal thereon. Electrically conductive, tubular connection members or jacks 24, 25, 26 are formed on the frame 22 and are electrically connected to first layer strips 11, 12, 13 respectively. The connection members 24, 25, 26 provide convenient outlets for making electrical connection into an electrical circuit to which the matrix is connected and are necessary because the conductive layers 10, 14, 15, 16, 17 are of such thin material that direct connection by normal means such as soldered connections would be impracticable. In the preferred embodiment, each connection member 24, 25, 26 extends perpendicularly through the frame 22 adjacent the respective first layer strip 11, 12, 13 to which it is connected and is swaged or crimped to the frame as at 49 (FIG. 5). Suitable jacks are those sold by the Cambridge Thermionic Corporation, 455 Concord Ave., Cambridge, Mass. 02138, under "Cambion" part No. 3344-2-03. This kind of connector-jack consists of a metal sleeve fastened to a conducting tab so that when mounted in the frame 22 the sleeve extends from the frame, as shown in FIG. 5 with respect to pin 31 (to be described). Electrical contact with any of the first conductive strips 11, 12, 13 is conveniently made by inserting in the respective sleeve a pin (not shown) connected to a wire. Good electrical contact between the conductive strips 11, 12, 13 and the connector jacks is obtained by the use of silver paste deposited over and between the respective jacks and conductive strips as at 50. A connecting member 27 (FIG. 2) similar to members 24, 25, 26 is provided on the first frame 22 for making electrical contact with the third layer 15. The connection between member 27 of the first frame 22 and the third layer 15 is not shown in FIG. 3, but is similar to that between member 31 (to be described) of the second frame 28 (to be described) and the third layer 15 as shown in FIGS. 3 and 5.

With further reference to FIG. 3, a second frame 28 is suitably attached to the first frame 22 by a non-conductive adhesive 29. An opening 30 similar to opening 23 is formed through the second frame 28. The first and second frames 22, 28 support the matrix (comprising layers 10, 14, 15, 16, 17) in planar configuration and in mutual contact, the first frame opening 23, layers 10, 14, 15, 16, 17, and second frame opening 30 being of similar shape and mounted mutually in register. It should be understood that the thicknesses of layers 10, 14, 15, 16, 17 in FIG. 3 are not drawn closely to scale but are exaggerated for clarity; the matrix comprising layers 10, 14, 15, 16, 17 is of a total thickness of only several thousand angstroms. FIG. 5 is provided to show the lower portion of the matrix in a less exaggerated manner, though FIG. 5 is also distorted for clarity.

Figure 4:
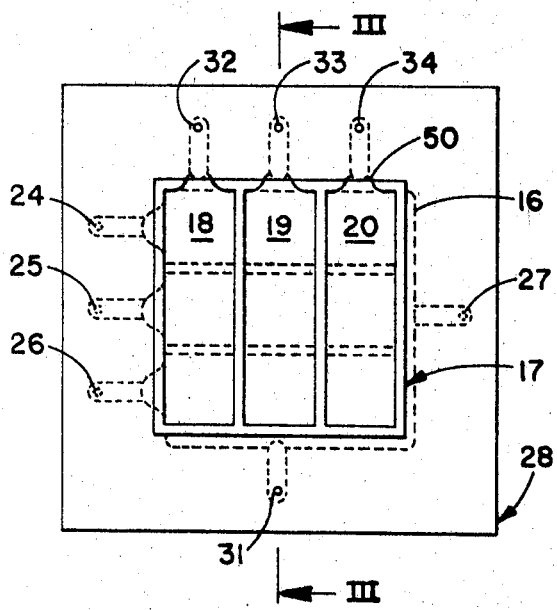

With reference to FIG. 4, the second non-conducting frame 28 supports the matrix at its fourth and fifth layers 16, 17 (the fifth layer 17 comprising electrically conductive strips 18, 19, 20). Electrically conductive connection members or jacks 32, 33, 34 are mounted on and through the frame 28 and are electrically connected to second strips 18, 19, 20, respectively, in the same manner described above with respect to the connecting members 24, 25, 26 described above. Electrical connection between members 32, 33, 34 and second strips 18, 19, 20, respectively, is ensured by strips of silver paste 50 extending over the respective second strips 18, 19, 20 and to the respective connection members 32, 33, 34 as described above with respect to the first strips 11, 12, 13 (FIG. 2). Connecting member 31 is mounted on and through the frame 28 for convenient connection to the third layer 15.

Referring again to FIG. 1, the circuit in which the matrix is used is shown in the block diagram. Considering first the first, second, and third layers 10, 14, 15, a separate sensing capacitor is, in effect, formed by each of the conductive strips 11, 12, 13 in cooperation with the respective adjacent area of the second, or dielectric layer 14 and the conductive, third layer 15. A source of electric potential represented by a battery 35 is connected between the conductive layer 15 and the conductive strips 11, 12, 13, with parallel resistors 36, 37, 38 each being connected between the battery and a respective one of the conductive strips. Connection is made from the conductive strips 11, 12, 13 through coupling of filtering capacitors 39, 40, 41, respectively, to three corresponding detection circuits. The detection circuit for strip 11, for example, comprises input network 42, high-speed comparator 43, and indicating circuit 44. As shown in FIG. 1, similar detecting circuits are likewise connected through similar circuitry to the third layer 15 and the vertical conductive strips 18, 19, 20 of the fifth layer 17. There is provided a corresponding dection circuit for each of the strips 18, 19, 20 as represented by the detection circuit for strip 18 and comprising input network 45, high-speed comparator 46, an dindicating circuit 47. A battery 48 is connected between the vertical strips 18, 19, 20 and the third layer 15 through circuitry similar to that provided for battery 35.

In operation, a charge is applied to each of the horizontal conducting strips 11, 12, 13 of the first layer 10 by the battery 35 acting through charging resistors 36, 37, 38. Vertical conducting strips 18, 19, 20 are similarly charged, relative to the center conductive layer 15, by battery 48. Upon the penetration of the matrix at horizontal strip 11 by a hypervelocity particle, a conductive plasma path is created between the horizontal strip 11 and the conducting layer 15. The plasma path creates an arc between the strip 11 and the layer 15, and a drop in voltage results at the strip 11. This voltage drop results in a voltage drop across direct current blocking capacitor 39, which, in turn, is sensed by input network 42. The input network 42 rejects false signals which may result from radio frequency interference, but allows signals of the proper characteristics to pass to the comparator 43. The comparator 43 compares the pulse height of the output of the input network 42 with a reference and, if the pulse height is larger than the reference, triggers the indicating circuit 44. The pulse from indicating circuit 44 thus provides the approximate vertical position, or y coordinate, on the matrix of the prenetration by the particle.

The vertical strips 18, 19, 20 act similarly with conductive layer 15 and dielectric layer 16 to indicate the lateral, or x position on the matrix at which the particle penetrates the matrix. Assuming that the particle described above also penetrates the vertical strip 18, the detection circuit comprising input network 45, comparator 46, and indicating circuit 47 will also be actuated. Thus, the outputs of indicating circuits 44 and 47 provide data which may be interpreted to provide the approximate y and x coordinates of the point on the matrix at which the particle penetrates the matrix.

When used with a similar, second matrix (not shown) spaced a known distance from the first matrix, the time and position at which the particle penetrates the first matrix is compared with the time and position of penetration of the second matrix, and the velocity and direction of the particle may be determined by a high speed computer.

The matrix may be constructed using many more conductive strips than are shown for the present embodiment. It may be seen that an increase in the number of conductive strips in the first and fifth layers 10, 17 and in the number of corresponding detecting networks would allow a more accurate determination of the location of penetration. In the matrix embodiment shown in the drawing, three strips in each layer are use dto provide a total of nine distinguishable matrix sections. If one layer comprising nine separate small capacitor elements, rather than the present structure using two layers comprising six elements, were used to provide the nine matrix sections, nine detecting networks would also be required. The advantage of the use of the two layers 10, 17 of strips is seen more readily in the case of matrices having a greater number of sections. For example, if $n$, or the number of distinguishable sections per side were 10, then $n^2$ or 100 separate capacitor elements and detecting circuits would be needed if a single layer of capacitors were used, while only $2n$, or 20 conductive strips (10 vertical and 10 horizontal) and 20 corresponding detecting circuits are needed using the two layer system of the present invention.

The use of the center conductive layer 15 has been found by the present inventor to insure positive determination of the particular strip penetrated, whereas, in any matrix without such a center conductive layer, coupling between the capacitive elements and interference within a corresponding detection circuit result.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. A thin-film capacitor matrix for the detection and analysis of hypervelocity particles which penetrate the matrix, comprising:
   a first layer, comprising a thin layer of conductive material divided into a plurality of parallel conductive strips, the strips, being electrically insulated from each other, the first layer having first and second, mutually perpendicular axes, with the conductive strips being aligned parallel to one of the axes;
   a second layer, comprising a thin layer of dielectric material in register with and contacting the first layer;
   a third layer, comprising a thin layer of conductive material, in register with and contacting the second layer;
   a fourth layer, comprising a thin layer of dielectric material in register with and contacting the third layer, the third layer being disposed between the second and fourth layers;
   a fifth layer, comprising a thin layer of conductive material divided into a plurality of parallel conductive strips, the fifth layer being in register with and contacting the fourth layer, the conductive strips of the fifth layer being electrically insulated from each other and of a configuration like that of the first layer strips, the fifth layer lying in a plane parallel to the plane of the first layer but with its strips perpendicular to the strips of the first layer; and
   means for supporting the five layers in planar configuration.

2. The capacitor matrix of claim 1, the second and fourth layers comprising films of a plastic material.

3. The capacitor matrix recited in claim 1, the means for supporting the five layers in planar configuration comprising first and second, mutually spaced frames which are immovably located with respect to each other and disposed in mutual register.

4. The capacitor matrix of claim 1, the conductive material of the first, third, and fifth layers comprising vapor-deposited metal.

References Cited

UNITED STATES PATENTS 3,307,407   3/1967   Berg _____ 317—246 X

ELLIOT A. GOLDBERG, Primary Examiner

U.S. Cl. X.R.

73—432; 317—261